(12) United States Patent
Barron et al.

(10) Patent No.: US 9,900,735 B2
(45) Date of Patent: Feb. 20, 2018

(54) COMMUNICATION SYSTEMS

(71) Applicant: Federal Signal Corporation, Oak Brook, IL (US)

(72) Inventors: Traci Barron, St John, IN (US); Scott Cassidy, Crown Point, IN (US); David Perry, Cambridge, MA (US); Eric Sugalski, West Chester, PA (US)

(73) Assignee: FEDERAL SIGNAL CORPORATION, Oak Brook, IL (US)

( * ) Notice: Subject to any disclaimer, the term of this patent is extended or adjusted under 35 U.S.C. 154(b) by 0 days.

(21) Appl. No.: 14/974,896

(22) Filed: Dec. 18, 2015

(65) Prior Publication Data

US 2017/0180923 A1    Jun. 22, 2017

(51) Int. Cl.
H04B 1/38       (2015.01)
H04W 4/02       (2018.01)
H04R 3/00       (2006.01)
H04B 1/3827     (2015.01)

(52) U.S. Cl.
CPC ............. H04W 4/02 (2013.01); H04R 3/002 (2013.01); *H04B 2001/3866* (2013.01); *H04R 2420/07* (2013.01); *H04R 2430/01* (2013.01)

(58) Field of Classification Search
CPC ......... H03R 3/002; H04B 1/10; H04B 1/1081
USPC .... 45/73, 63.1, 570, 501, 296; 455/73, 63.1, 455/570, 501, 296
See application file for complete search history.

(56) References Cited

U.S. PATENT DOCUMENTS

| | | |
|---|---|---|
| 4,310,732 A | 1/1982 | Stearns et al. |
| 4,987,592 A | 1/1991 | Flagg |
| D322,440 S | 12/1991 | Urella |
| 5,138,722 A | 8/1992 | Urella et al. |
| 5,185,807 A | 2/1993 | Bergin et al. |
| 5,241,971 A | 9/1993 | Lundin |
| D351,390 S | 10/1994 | Urella et al. |
| 5,384,857 A | 1/1995 | Nordin et al. |
| 5,404,577 A | 4/1995 | Zuckerman et al. |
| 5,423,082 A * | 6/1995 | Cygan .................. H03F 1/3247 330/129 |
| 5,426,719 A | 6/1995 | Franks et al. |
| 5,590,213 A | 12/1996 | Urella et al. |
| 5,631,659 A | 5/1997 | Evans et al. |
| 5,631,965 A | 5/1997 | Chang et al. |
| 5,721,783 A | 2/1998 | Anderson |
| D391,575 S | 3/1998 | Bergin et al. |
| D398,309 S | 9/1998 | Bergin et al. |
| D411,200 S | 6/1999 | Almqvist |
| 5,911,314 A | 6/1999 | Urella et al. |
| 5,933,506 A | 8/1999 | Aoki et al. |
| 5,970,155 A | 10/1999 | Leppalahti |
| 6,010,216 A | 1/2000 | Jesiek |
| D432,526 S | 10/2000 | Claesson |

(Continued)

OTHER PUBLICATIONS

3M Peltor Lite-Com Pro II UHF Two-Way Radio Headset, http://multimedia.3m.com/mws/mediawebserver?mwsId=SSSSSufSevTsZxtU5x_BN8_9evUqevTSevTSevTSeSSSSSS--&fn=3M%20Lite-Com%20Proll%20Sellsht%20LR.pdf, Accessed Dec. 18, 2015, 2 pages.

(Continued)

*Primary Examiner* — Tuan Pham

(74) *Attorney, Agent, or Firm* — Merchant & Gould P.C.

(57) ABSTRACT

A communication system providing volume attenuation as a function of distance from the communication source to simulate natural communication.

15 Claims, 3 Drawing Sheets

(56) References Cited

U.S. PATENT DOCUMENTS

| | | |
|---|---|---|
| D434,191 S | 11/2000 | Emilsson |
| 6,456,721 B1 | 9/2002 | Fukuda |
| 6,463,157 B1 | 10/2002 | May |
| D465,616 S | 11/2002 | Nilsson |
| 6,484,027 B1 | 11/2002 | Mauney et al. |
| 6,684,976 B1 | 2/2004 | Sheppard, Jr. |
| 6,687,377 B2 | 2/2004 | Voix et al. |
| 6,801,629 B2 | 10/2004 | Brimhall et al. |
| D506,577 S | 6/2005 | Emilsson |
| D509,323 S | 9/2005 | Emilsson |
| 6,941,161 B1 | 9/2005 | Bobisuthi et al. |
| 6,965,681 B2 | 11/2005 | Almqvist |
| 7,215,766 B2 | 5/2007 | Wurtz |
| D547,500 S | 6/2007 | Kärrman |
| 7,269,452 B2 | 9/2007 | Cheung et al. |
| 7,317,809 B2 | 1/2008 | Almqvist |
| D563,944 S | 3/2008 | Heringslack |
| 7,342,502 B2 | 3/2008 | Harkins et al. |
| 7,353,018 B2 | 4/2008 | Mauney et al. |
| 7,359,504 B1 | 4/2008 | Reuss et al. |
| 7,391,878 B2 | 6/2008 | Liao |
| 7,403,793 B2 | 7/2008 | Mauney et al. |
| 7,551,940 B2 | 6/2009 | Paulson et al. |
| 7,599,685 B2 | 10/2009 | Goldberg et al. |
| 7,813,729 B2 | 10/2010 | Lee et al. |
| 7,826,382 B2 | 11/2010 | Sicurello et al. |
| 7,890,661 B2 | 2/2011 | Spurgat et al. |
| 7,929,713 B2 | 4/2011 | Victorian et al. |
| 7,941,167 B2 | 5/2011 | Xu et al. |
| 7,953,456 B2 | 5/2011 | Romesburg et al. |
| 7,957,735 B1 | 6/2011 | Lee et al. |
| 7,983,428 B2 | 7/2011 | Ma et al. |
| 7,983,770 B2 | 7/2011 | Langgood et al. |
| 8,041,040 B2 | 10/2011 | Imaki |
| 8,072,095 B2 | 12/2011 | Lawrence |
| 8,072,905 B2 | 12/2011 | Haff et al. |
| 8,081,780 B2 | 12/2011 | Goldstein et al. |
| 8,111,833 B2 | 2/2012 | Seydoux |
| 8,126,492 B2 | 2/2012 | Hannosh et al. |
| 8,130,970 B2 | 3/2012 | Heringslack |
| 8,130,985 B2 | 3/2012 | Emilsson |
| 8,130,995 B2 | 3/2012 | Her et al. |
| 8,145,204 B2 | 3/2012 | Saito |
| 8,189,801 B2 | 5/2012 | Heringslack |
| 8,194,875 B2 | 6/2012 | Miranda |
| 8,199,927 B1 | 6/2012 | Raftery |
| 8,207,855 B2 | 6/2012 | Westerlund et al. |
| 8,223,994 B2 | 7/2012 | Kihlberg |
| 8,224,011 B2 | 7/2012 | Heringslack |
| 8,229,740 B2 | 7/2012 | Nordholm et al. |
| 8,233,947 B2 | 7/2012 | Kushnirov |
| 8,243,943 B2 | 8/2012 | Nordin et al. |
| 8,243,973 B2 | 8/2012 | Rickards et al. |
| 8,260,261 B2 | 9/2012 | Teague |
| 8,265,691 B2 | 9/2012 | Mauney et al. |
| 8,270,630 B2 | 9/2012 | Johnson |
| 8,270,649 B2 | 9/2012 | Semcken |
| 8,295,497 B2 | 10/2012 | Roeck et al. |
| 8,321,213 B2 | 11/2012 | Petit et al. |
| 8,391,523 B2 | 3/2013 | Biundo Lotito et al. |
| 8,416,961 B2 | 4/2013 | Lee et al. |
| 8,483,418 B2 | 7/2013 | Platz et al. |
| 8,675,897 B2 | 3/2014 | Fukuda et al. |
| 8,750,527 B2 | 6/2014 | Tiscareno et al. |
| 2003/0100274 A1 | 5/2003 | Brown et al. |
| 2005/0281422 A1 | 12/2005 | Armstrong et al. |
| 2007/0041606 A1 | 2/2007 | Sheppard, Jr. |
| 2007/0147635 A1 | 6/2007 | Dijkstra et al. |
| 2008/0002948 A1* | 1/2008 | Murata ............... H04S 1/005 386/338 |
| 2008/0102871 A1 | 5/2008 | Watt et al. |
| 2009/0136052 A1 | 5/2009 | Hohlfeld et al. |
| 2009/0141906 A1 | 6/2009 | Truesdell |
| 2010/0014686 A1 | 1/2010 | Karrman |
| 2010/0062713 A1 | 3/2010 | Blamey et al. |
| 2010/0119077 A1 | 5/2010 | Platz et al. |
| 2011/0007916 A1 | 1/2011 | Chapero-Rueda et al. |
| 2011/0069841 A1* | 3/2011 | Angeloff ............ H03G 3/30 381/17 |
| 2012/0087519 A1 | 4/2012 | Emilsson |
| 2012/0224709 A1 | 9/2012 | Keddem et al. |
| 2013/0064403 A1 | 3/2013 | Hasler et al. |
| 2013/0094658 A1 | 4/2013 | Holter |
| 2013/0208909 A1 | 8/2013 | Mülder |
| 2014/0072118 A1* | 3/2014 | Abe ............... H04N 21/42203 379/406.01 |
| 2014/0079212 A1* | 3/2014 | Sako ............... H04M 1/60 379/395 |
| 2014/0250513 A1* | 9/2014 | Cao ............... H04L 63/08 726/7 |
| 2015/0071471 A1* | 3/2015 | Shao ............... H04R 1/2811 381/332 |
| 2015/0334504 A1* | 11/2015 | Donaldson ............ H04S 7/303 381/307 |

OTHER PUBLICATIONS

3M Peltor ORA TAC In-Ear Communications Headset, http://multimedia.3m.com/mws/mediawebserver?mwsId=SSSSSufSevTsZxtU5x_1OxtGevUqevTSevTSevTSeSSSSSS--&fn=3M_ORATACSellSheet_LR0921.pdf, Accessed Dec. 18, 2015, 2 pages.
David Clark, Series 3100 Communication System with Noise Attenuating Headsets, http://www.davidclark.com/PDFfiles/3100Brochure.pdf, Accessed Dec. 18, 2015, 6 pages.
Sensear, Two Way Radio Headset/Noise Cancelling Bluetooth Headsets, http://www.sensear.com/, Accessed Dec. 18, 2015, 4 pages.
Quietpro—Intelligent Hearing Protection & Communication Systems, http://www.honeywellsafety.com/quietpro/, Accessed Dec. 18, 2015, 2 pages.
Setcom—Liberator TwinTalk Intercom System, http://www.setcomcorp.com/industrial-two-person-intercom.html, Accessed Dec. 18, 2015, 2 pages.
Sena, SPH10 Bluetooth Stereo Headset & Intercom, http://www.sena.com/product/intercoms/sph10/, Accessed Dec. 18, 2015, 8 pages.
TEA Tactical headsets and PTTs, http://teaheadsets.com/, Accessed Dec. 18, 2015, 2 pages.
Silnyx Communications, Protection from within, http://silynxcom.com/, Accessed Dec. 18, 2015, 6 pages.
Otto, Federal/Military, http://www.ottoexcellence.com/shop-by-department/communications/federal-/-military/, Accessed Dec. 18, 2015, 2 pages.
Power-time, http://www.power-time.com/, Accessed Dec. 18, 2015, 2 pages.
Cardo Systems Products, http://www.cardosystems.com/us/scala-rider, Accessed Dec. 18, 2015, 4 pages.
Chatterbox, Xbi2Hplus, http://chatterboxusa.com/, Accessed Dec. 18, 2015, 3 pages.
Autocom, Bluetooth & Wired Helmet Communication Headsets, http://www.autocom.co.uk, Accessed Dec. 18, 2015, 3 pages.

* cited by examiner

COMMUNICATION SYSTEMS

BACKGROUND

Communication systems (e.g., wireless communication systems) are commonly employed in environments where it is difficult to hear (e.g., noisy environments), such as constructions sites, factories and the like. In a typical noisy work environment, most speech communication is intended for individuals nearby, e.g., between/among workers who may be partnering or collaborating to perform a task. Without the background noise, these individuals would simply speak to each other naturally. However, due to the noise generated in some environments, in addition to the hearing protection devices that are often required in such environments, natural speech patterns are not possible, thereby hindering communication.

SUMMARY

In general terms, this disclosure is directed to a communication system that simulates a natural speech environment.

In one aspect a communication system modulates sound volume based on a distance between the transmitter of the communication and the receiver of the communication.

In another aspect, a communication system modulates sound volume based on transmission impedance occasioned by one or more physical structures.

In a further aspect, a communication system modulates sound volume based on measured radio frequency (RF) signal strength received from the communication transmitter.

DETAILED DESCRIPTION

Figure 1:
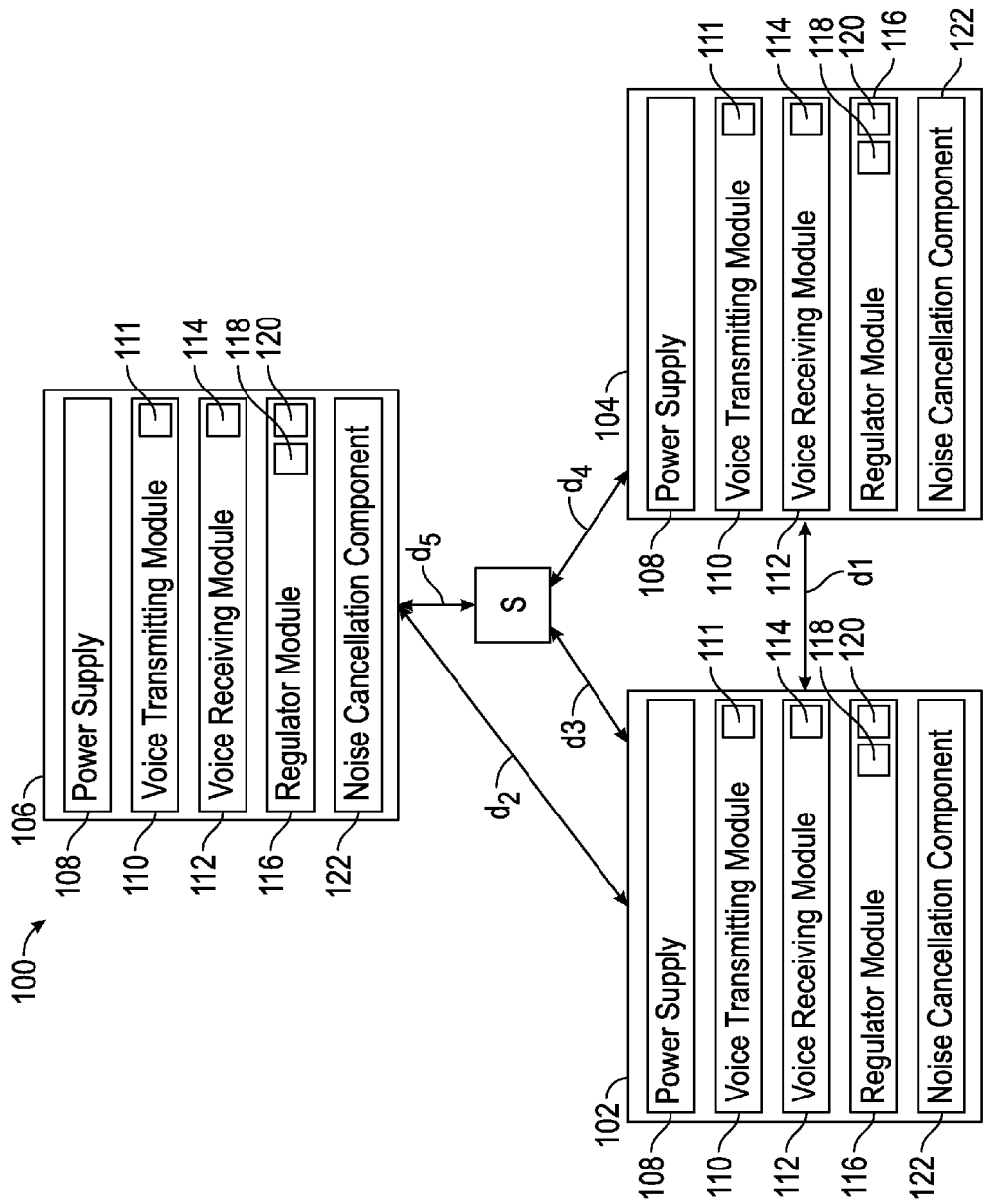
FIG. 1 is a schematic illustration of an example communication system in accordance with the present disclosure.

The present disclosure is directed towards a communication system. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic illustration of an example communication system 100 in accordance with the present disclosure. The communication system 100 includes a plurality of voice transceiving devices. In the example in FIG. 1, a first voice transceiving device 102, a second voice transceiving device 104 and a third voice transceiving device 106 are shown. However, it should be appreciated that any suitable number of such voice transceiving devices may be included in the communication system 100. Each of the voice transceiving devices (102, 104, 106) includes a power supply 108, a voice transmitting module 110 having a microphone 111, a voice receiving module 112 having a speaker 114, and a regulator module 116 having a positioning submodule 118 and optionally a transmission impedance submodule 120. Each of the voice transceiving devices (102, 104, 106) also includes a noise cancellation component 122. Each of the voice transceiving devices is associated with one of the users of the communication system 100. The communication system 100 enables its users to orally communicate with one another via the voice transceiving devices.

The power supply 108 selectively (e.g., via an on/off switch) provides power to the voice transceiving device (102, 104, 106). Examples of power supplies 108 include batteries, solar cells, and so forth.

The voice transmitting module 110 converts a user's voice into an analog audio signal with the microphone 111, and transmits the analog audio signal as a digitized waveform or an analog waveform (e.g., a radio frequency ("RF") signal using digital RF modulation or analog RF modulation) via an antenna to one or more other voice transceiving devices in the communication system 100.

The voice receiving module 112 receives (e.g., via an antenna) digitized wave signals (e.g., RF signals) from one or more other voice transceiving devices in the communication system, converts those signals (e.g., via an antenna) into analog audio signals, and converts the analog audio signals into sound waves that are transmitted to a user's ear with the speaker 114.

The regulator module 116 selectively modulates the audio analog fed to the speaker 114 according to one or more predetermined algorithms. The form of audio analog fed to the speaker 114 correlates with characteristics of the sound produced by the speaker 114. In some examples, the regulator module 116 modulates the audio analog fed to the speaker 114 in order to decrease the volume the speaker 114 would otherwise produce. According to some example algorithms, the regulator module 116 attenuates volume as a mathematical function of the distance from the voice transceiver at which the voice communication originates.

In some examples, the regulator module 116 includes circuitry having one or more electrical components such as electrical comparators, electrical operational amplifiers, digital modulators, digital to analog converters, analog to digital converters, and/or digital filters/decimators. In some examples, the regulator module 116 is programmable, e.g., via a field programmable gate array, the one or more volume attenuation algorithms being programmed thereby either remotely (e.g., via a Wi-Fi connection), or through a hard connection. In some examples, the regulator module 116 includes a programmable audio processing engine having one or more analog inputs and one or more analog outputs. By utilizing circuitry having one or more electrical components such as electrical comparators, electrical operational amplifiers, digital modulators, digital to analog converters, analog to digital converters, and/or digital filters/decimators, the audio processing engine modulates one or more audio analog input signals by, e.g., filtering, level control, signal level monitoring, and mixing. Thus in some examples, the regulator module 116 comprising a programmable audio processing engine receives audio analog inputs from the voice receiving module 112, modulates the audio analog input signals, and outputs modulated analog audio signals to the speaker 114 according to one or more programmed algorithms.

In one example, the regulator module 116 is an ADAU1772 programmable codec from Analog Devices, Inc. of Norwood. Me. However, other chips and configurations are possible.

The positioning submodule 118 of each of the receiving voice transceiving devices 104, 106, for example, measures the distance ($d_1$, $d_2$) between receiving voice transceiving device 104, 106 and the transmitting voice transceiving device 102. Such distances can be defined, e.g., as the distance between respective antennas of the relevant transceiving devices. The positioning submodule 118 measures distance through any suitable means, e.g. via GPS, RF signal strength, Wi-Fi hub triangulation, and so forth.

RF signal strength predictably decreases over distance. Thus, the distance between the receiving voice transceiving device (104, 106) and the transmitting voice transceiving device (102) can be determined based on the RF signal strength received from the transmitting transceiving device. This distance is then plugged into an algorithm used by the regulator module to modulate the analog audio signal fed to the speaker 114 in the voice transceiving device (104, 106), resulting in sound waves that have been modulated as a mathematical function of distance from the sound source. Thus, the regulator module 116, in conjunction with the positioning submodule 118, can simulate natural voice communication by reducing the volume produced at the speaker 114 of the receiving transceiving device 104, 106 as a mathematical function of the distance from the source of the sound.

In some examples, the positioning submodule 118 outputs a signal (e.g., an analog signal) corresponding to a distance (a "distance signal"), the distance signal travelling to a programmed audio processing engine in the regulator module 116. In these examples, the audio processing engine is programmed to modulate an analog audio signal coming from the voice receiving module 112 based on the distance signal received, thereafter outputting the modulated analog signal to the speaker 114.

It should be noted that factors other than distance can result in RF signal degradation. For example, RF signal strength predictably degrades based on an impeding structure's location relative to the voice transceivers involved, as well as the impeding structure's material, size, and so forth. Some of these factors can also cause varying degrees of attenuation of sound volume in a natural environment. Thus, in some examples of the communication system 100, the regulator module 116 alternatively or further modulates the analog audio signal fed to the speaker 114 as a mathematical function of transmission impedance created by one or more physical structures S. In some instances, such as when S is a wall that separates a transmitting voice transceiving device 102 (i.e., the human speaker) from a receiving voice transceiving device 104, 106 (i.e., the human listener), the structure S is capable of causing both an RF signal degradation when the communication system 100 is in use, as well as a significant volume attenuation in a natural environment (i.e., an environment without the communication system 100). In other instances, such as when S is spatially a relatively non-obstructive metallic object (e.g., a metal tool box), the structure S is capable of causing a predictable RF signal degradation when the communication system 100 is in use, but does not cause significant volume attenuation in a natural environment.

Thus, in some examples, the transmission impedance submodule 120 can detect a physical structure S (e.g., a wall, an object) between itself and the source of the voice. In some examples, the transmission impedance submodule 120 also determines one or more parameters of the physical structure S (e.g., height, width, thickness, density, material (e.g. metallic versus non-metallic), etc.). In some examples, the transmission impedance submodule 120 can also use the positioning submodule 118 to determine a distance ($d_3$, $d_4$, $d_5$) to the physical structure S.

Based on the relative location and/or characteristics of the structure S as determined by the transmission impedance submodule 120, signals (e.g., analog signals) can travel to the regulator module 116 to modulate (according to a predetermined algorithm) the analog audio signal fed to the speaker 114 in the receiving voice transceiving device (104, 106), resulting in sound waves produced by the speaker 114 that have been modulated as a result of the presence of the physical structure S. For example, if the structure S is a wall between the transmitting voice transceiving device 102 and the receiving voice transceiving device (104, 106), the algorithm assumes that the structure S would cause a natural volume attenuation in addition to an RF signal degradation, such that the total degradation in RF signal strength received by the receiving voice transceiving device (104, 106) is applied to modulate the volume in the speaker 114 of the receiving voice transceiving device (104, 106). Conversely, if the structure S is a relatively small metallic object, the algorithm assumes that the structure S would not cause a natural volume attenuation, and therefore the RF signal strength degradation occasioned by the structure S is subtracted from the total degradation received by the receiving voice transceiving device (104, 106) when modulating the volume produced by the speaker 114.

In alternative examples, the transmission impedance submodule 120 includes a predetermined map of the area of use for the communication system 100. The map can include spatial and other impedance related information (e.g., size, material) about one or more structures S within the area. In some examples, the communication system 100 is pre-programmed with such information. The map can take into account locations of one or more structures S within the area, as well as the degree of inherent signal strength degradation occasioned by each such structure (e.g., degradation resulting from the structure's size, material and/or location relative to other structures). The positioning submodule 118 determines the location of the receiving voice transceiving device (104, 106) on the map, i.e., within the area of use for the communication system 100 and relative to the one or more structures S within the area. The regulator module 116 then modulates the analog audio signal fed to the speaker 114 based on the distance between the transmitting voice transceiving device 102 and the receiving voice transceiving device, 104, 106 (as determined by the positioning submodule 118) and the location of the receiving voice transceiving device 104, 106 on the map.

In some examples, the transmission impedance submodule 120 outputs a signal (e.g., an analog signal) corresponding to a structural impedance (an "impedance signal"), the impedance signal travelling to a programmed audio processing engine in the regulator module 116. In these examples, the audio processing engine is programmed to modulate an analog audio signal coming from the voice receiving module 112 based on the impedance signal received from the transmission impedance submodule 120 and/or based on the distance signal received from the positioning submodule 118, thereafter outputting the modulated analog signal to the speaker 114.

The noise cancellation component 122 reduces the ambient noise present in the environment, such as noise from tools, machinery, construction, demolition, and the like. In some examples, the noise cancellation component neutralizes ambient noise by emitting sound waves that are 180° out of phase with the ambient noise, i.e., active noise attenuation. The noise cancellation component 122 can also include sound blocking and absorption features in or surrounding the users' ears, such as ear plugs, head phones and so forth (i.e., passive noise attenuation). Active and passive noise attenuation, employed individually or in combination can help protect users of the communication system 100 from high ambient noise levels and/or improve intelligibility of the received audio by improving the signal to noise ratio.

The noise cancellation component 122 does not interfere with the transmission of sound to the user's ear via the speaker 114. For example, an ear plug can be configured with an unobstructed path (e.g., a bore, tube) leading from the speaker 114 to the terminal of the ear plug closest to the user's ear drum.

Figure 2:
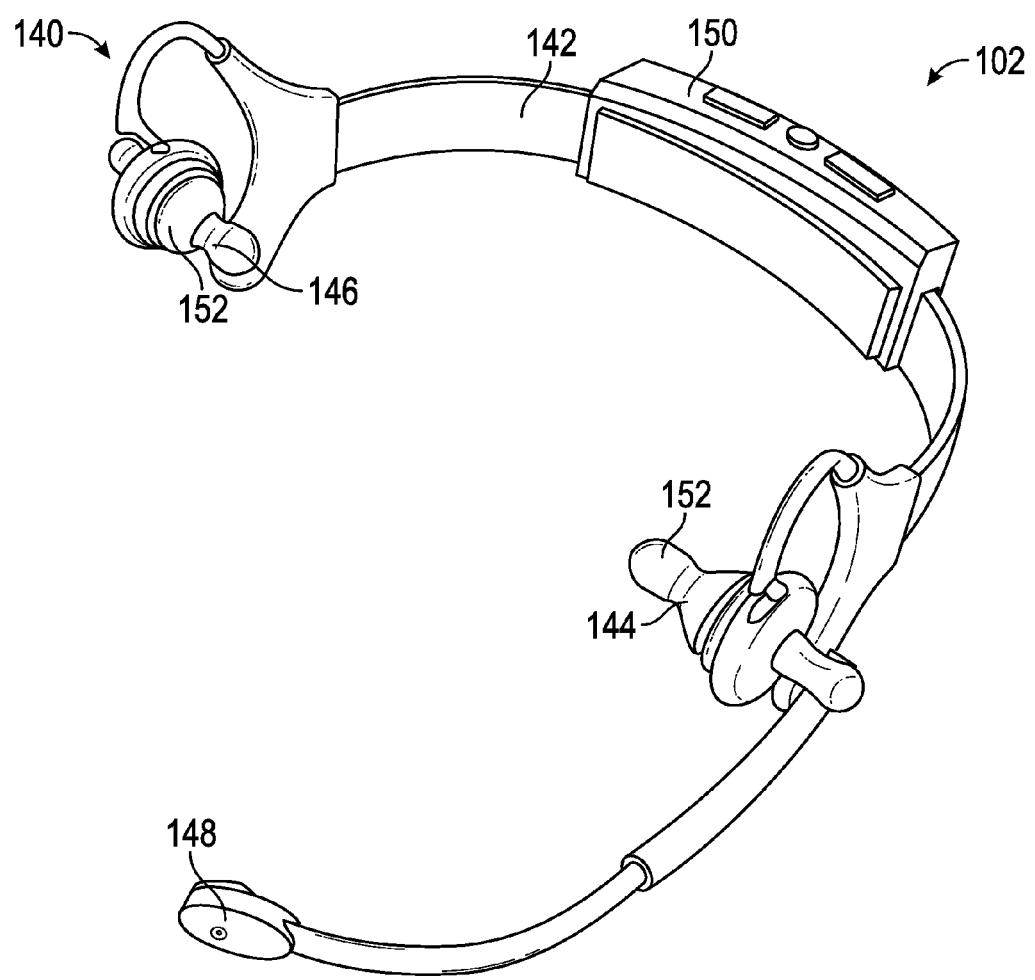
FIG. 2 is a perspective view of an example embodiment of a voice transceiving device of FIG. 1.

FIG. 2 is a perspective view of an example embodiment of the voice transceiving device 102 of FIG. 1, which could be equivalently the voice transceiving device 104 or 106. The voice transceiving device 102 includes a headset 140 having a band 142 connecting the ear pieces 144 and 146, a mouthpiece 148, and an electronics compartment 150. The ear pieces 144 and 146 and the mouthpiece 148 are electronically connected to one another. The headset 140 is placed about a user's head, neck, helmet or hard hat such that the ear pieces 144 and 146 can be placed in the user's ears and the mouthpiece 148 is adjacent the user's mouth. The ear pieces 144 and 146 include passive noise attenuation elements 152. The passive noise attenuation elements 152 can be configured to block, absorb, and/or cancel ambient noise, i.e., to provide passive noise attenuation. The passive noise attenuation elements 152 can serve to attenuate ambient noise by absorbing or deflecting the noise before it reaches the user's ear. In some examples, the passive noise attenuation elements 152 include a compressible material (e.g., a foam) that hugs the interior of the user's ears. A variety of configurations and materials can be used for the passive noise attenuation elements 152.

The mouthpiece 148 includes the voice transmitting module 110 and the microphone 111 described above. One or both of the ear pieces 144, 146 includes the speaker 114 of the voice receiving module 112 as described above. In some examples, one or both of the ear pieces 144, 146 include an unobstructed path from the speaker 114 to the user's ear. The remaining components of the voice receiving module 112 are disposed in one or both of the ear pieces 144, 146 and/or in the electronics compartment 150. The electronics compartment 150 includes circuitry required for performing active noise attenuation, housing the power supply 108 and the regulator module 116 having the positioning submodule 118 and the transmission impedance submodule 120, as described above. In some examples, the electronics compartment 150 also includes one or more antennas for transmitting and receiving RF signals, and for providing a location reference for the voice transceiving device used by the positioning submodule 118 to determine distance from another transceiving device.

In some examples, each user of the communication system 100 of FIG. 1 has access to or wears a headset 140. For a listening user wearing a headset 140, an RF signal from a transmitting transceiving device is received by an antenna in the electronics compartment 150. Based on the RF signal strength received by the antenna and the causes for any signal strength degradation (as discussed above), the regulator module 116 determines to what degree an analog audio signal corresponding to the RF signal is modulated. The voice receiving module 112 then feeds the speaker 114 with the modulated analog audio signal which is then transmitted to the listening user's ear or ears via the speaker 114, the speaker 114 operating to convert the analog audio signal into sound pressure.

The degree of modulation could be zero, insignificant, substantial or total, the latter being in which zero analog audio signal is generated and no sound produced by the speaker 114. It should be also appreciated that components of the headset 140 can process RF signals coming from multiple sources (i.e., multiple transceiving devices) simultaneously or substantially simultaneously, and evaluate the proper amount of volume modulation for each source before transmitting the analog audio signals to the speaker 114. Thus, for example, the communication system 100 may allow for a single user to hear one or more user's voices while at the same time actively minimizing or eliminating one or more voices from other users of the communication system 100. In this manner, specific communicating groups can be established, in which certain users of the communication system 100 are included in a group that can hear or be heard by other members of the group, while other users are excluded from a group, and thus cannot hear or be heard by members of the group.

Additionally, in some examples a unique digital address associated with each headset 140 can be used to determine which headsets 140 can communicate (i.e., within a communicating group). Each user can select headsets 140 with which to communicate by selecting their corresponding addresses. In addition or alternatively, a centralized operator of the communication system 100 can be used to selectively route audio to specific headsets 140, e.g., by selecting specific headset addresses.

Likewise, the communication system 100 can be configured to allow communication between the headsets 140 and a centralized operator of the communication system 100, e.g., to facilitate the formation of communicating groups, for public announcements made by the operator to all users of the communication system, or so forth. In addition to routing communications to users of the system 100 within the same local area or vicinity, in some examples the centralized operator can also be used to route audio signals to remote communication devices, e.g., via one or more RF hubs that extend communication coverage to locations remote from the communication system 100. The operator may be connected to the one or more RF hubs through any suitable means, e.g., wirelessly or through an Ethernet connection.

For a speaking user wearing a headset 140, the speaker's voice is picked up by the microphone 111 disposed in the mouthpiece 148. The microphone 111 converts the sound pressure of the user's voice into an analog audio signal that travels to the electronics compartment 150, where it is transmitted via the antenna as an RF signal to other headsets 140 in the communication system 100.

Figure 3:
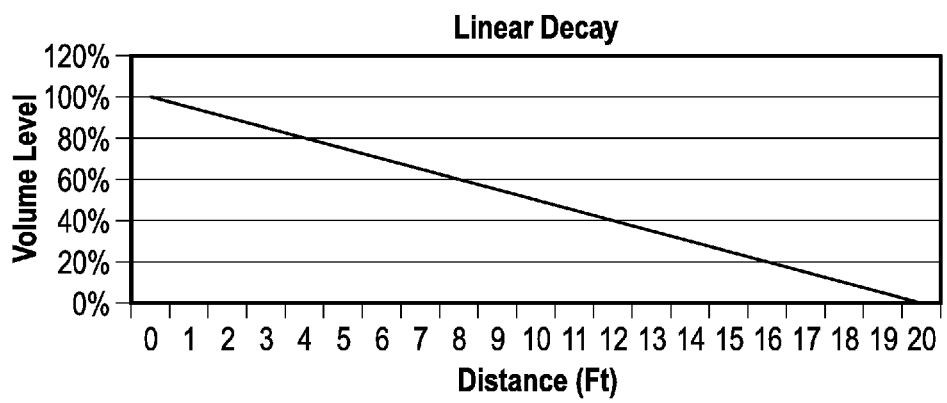
FIG. 3 is a graphical illustration of sound decay as a function of distance.
Figure 4:
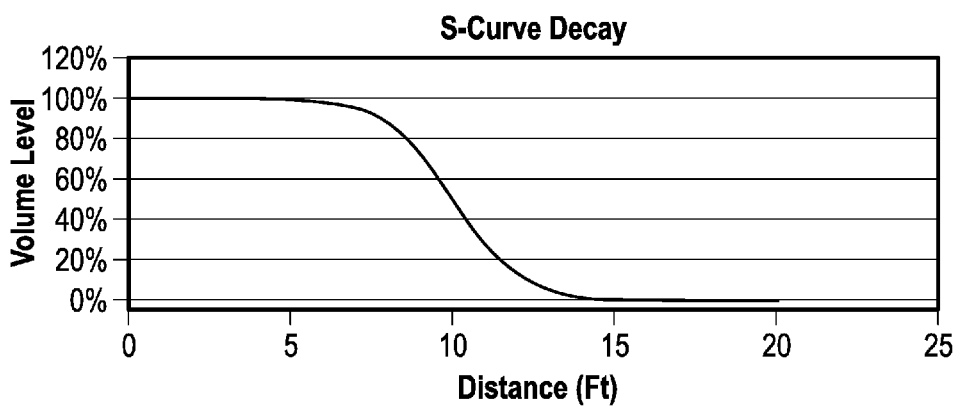
FIG. 4 is a further graphical illustration of sound decay as a function of distance.
Figure 5:
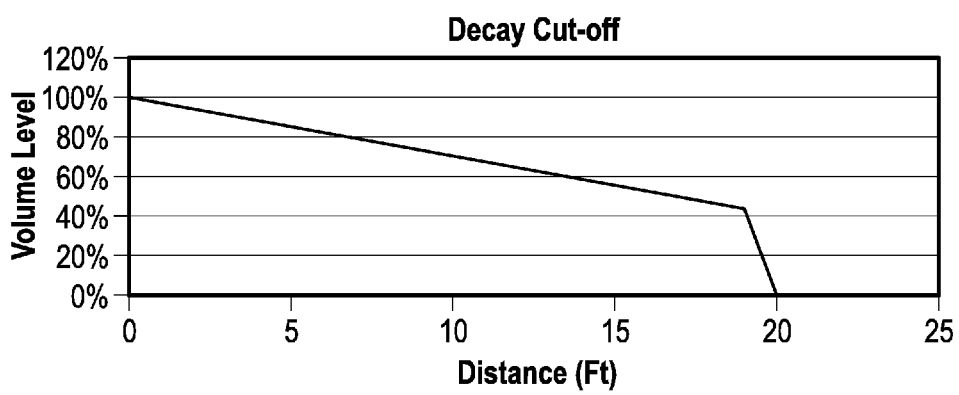
FIG. 5 is yet a further graphical illustration of sound decay as a function of distance.

As discussed above, the regulator module 116 selectively modulates the analog audio signal fed to the speaker 114 according to one or more predetermined algorithms. For example, the predetermined algorithm(s) can apply one of a variety of models to govern the decay of the sound volume as a mathematical function of the distance from the transmitting transceiving device. In one example, the algorithm causes a modulation in the analog audio signal that results in a sound volume decay as a linear mathematical function of distance, the volume decreasing at a consistent rate over distance. See the example "Linear Decay" plot in FIG. 3. In another example, the algorithm causes a modulation in the audio analog that results in little or no volume decay up to a threshold distance followed by rapid, exponential decay thereafter. That is, the volume level remains fairly constant within a certain proximity of the receiving transceiver, and then decreases rapidly. See the example "S-Curve Decay" plot in FIG. 4. In a further example, the algorithm causes a modulation in the analog audio signal that results in steady (e.g., linear) sound volume decay up to a threshold distance, followed by an abrupt total reduction to zero volume thereafter, rendering essentially inaudible voice transmissions originating beyond the threshold distance. See the example "Decay Cut-Off" plot in FIG. 5. In still further examples, the algorithm causes a modulation in the analog audio signal that results in logarithmic sound volume decay over distance. In a particular example, the sound volume decays according to an equation that approximates sound attenuation in a natural environment:

$$P_2 = P_1 + 20 \log_{10}(d_1/d_2),$$

where $d_1$ is the location of the sound source, $d_2$ is the reference location, $P_1$ is the sound pressure at $d_1$ and $P_2$ is the sound pressure at $d_2$.

It should be appreciated that the headset 140 can be modified in various ways. For example, the headset can include a single earpiece instead of two ear pieces. An ear loop can be used about the user's ear to keep the headset in place. One or more components of the headset (e.g., the electronics compartment) may be separate from the headset and connected thereto either with one or more wires or wirelessly. For example, the electronics compartment may be housed in a housing separate from the headset that can be mounted to another portion of the user's body, e.g., a belt, pants or a shirt. In some examples, the headset can use a BLUETOOTH® device. In some examples, one or more components of the headset (e.g., the ear pieces, the mouth piece, the electronics compartment, and/or the noise cancellation element) can be mounted directly to an article of clothing or gear worn by the user on or about the user's head, e.g., a helmet, a hard hat, or a pair of goggles or other protective gear.

In some embodiments, one or more of the voice transceiving devices (e.g., the voice transceiving devices 102, 104, 106) includes a regulator module override to selectively override the regulator module 116, thereby preventing modulation by the regulator module of the analog audio signals sent to the speaker 114. The regulator module override may be activated remotely (e.g., system wide for the entire communication system 100), or individually at the transceiving device. For example, if a user of the communication system 100 wishes to communicate a message to everyone in the communication system (e.g., a public address), in some examples that user may remotely disable each user's regulator module 116. In some examples, each regulator module 116 in the communication system 100 is automatically overridden for public address announcements made over the communication system 100. In some examples, a voice transmitting user can select specific voice transceiving devices on which to override the regulator module 116 (e.g., by selecting one or more digital addresses of other headsets 140, as described above). In some examples, a voice receiving user can override the regulator module 116 in his/her transceiving device with respect to all other transceiving devices in the communication system 100. Alternatively, the voice receiving user can override the regulator module 116 in his/her transceiving device with respect to one or more selected other transceiving devices in the communication system 100 (e.g., by selecting one or more digital addresses of other headsets 140, as described above). In alternative examples, a centralized operator of the communication system can make announcements (e.g., page one or more individuals) via an intercom and speakers disposed throughout the area of the communication system 100 for message repetition that can be heard by users of the system 100 without wearing their headsets 140.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication system, comprising:
   a plurality of transceiving devices including at least a first transceiving device and a second transceiving device, each of the plurality of transceiving devices comprising:
      a voice transmitting module having a microphone and configured to transmit signals to other transceiving devices in the communication system; and
      a voice receiving module having a speaker and configured to receive signals from the other transceiving devices in the communication system, the speaker being configured to provide an audio output;
   wherein at least the second transceiving device comprises a regulator module, the regulator module being configured to modulate first signals provided by the voice transmitting module of at least the first transceiving device and provide second signals to the voice receiving module of the second transceiving device, the second signals being modulated relative to the first signals based on a distance between the first and second transceiving devices;
   wherein a volume of the audio output generated by the speaker of the second transceiving device decreases according to a first mathematical function up to a threshold distance between the first and second transceiving devices; and
   wherein the volume of the audio output generated by the speaker of the second transceiving device decreases according to a second mathematical function for at least some distances between the first and the second transceiving devices that are greater than the threshold distance.

2. The communication system of claim 1, wherein the regulator module comprises a positioning submodule configured to determine the distance between the first and second transceiving devices.

3. The communication system of claim 2, wherein the positioning submodule determines the distance between the first transceiving device and the second transceiving device based on an RF signal strength at the second transceiving device.

4. The communication system of claim 3, wherein the regulator module comprises an audio processing engine.

5. The communication system of claim 1, wherein one of the first or the second mathematical function is an exponential decay function.

6. The communication system of claim 1, wherein one of the first or the second mathematical function is a linear function.

7. The communication system of claim 6, wherein the volume of the audio output generated by the speaker of the second transceiving device is zero for distances between the first and second transceiving devices that exceed the threshold distance.

8. A communication system, comprising:
a plurality of transceiving devices, each transceiving device comprising:
a voice transmitting module having a microphone and configured to transmit signals to other transceiving devices in the communication system;
a voice receiving module having a speaker and configured to receive signals from the other transceiving devices in the communication system; and
a regulator module comprising a positioning submodule and a transmission impedance submodule;
wherein the regulator module of a first of the transceiving devices is configured to modulate signals provided by the voice transmitting module of at least a second of the transceiving devices based on a distance between the first of the transceiving devices and the second of the transceiving devices;
wherein, the positioning submodule of the first of the transceiving devices is configured to determine the distance between the first of the transceiving devices and the second of the transceiving devices;
wherein the transmission impedance submodule is configured to determine impedance of signals caused by one or more physical structures;
wherein a volume of audio output generated by the speaker of the first of the transceiving devices decreases according to a first mathematical function up to a threshold distance between the first of the transceiving devices and the second of the transceiving devices; and
wherein the volume of audio output generated by the speaker of the first of the transceiving devices decreases according to a second mathematical function for at least some distances between the first of the transceiving devices and the second of the transceiving devices that are greater than the threshold distance.

9. The communication system of claim 8, wherein the positioning submodule determines the distance between the first of the transceiving devices and the second of the transceiving devices based on an RF signal strength measured at the first of the transceiving devices.

10. The communication system of claim 9, wherein the transmission impedance submodule determines impedance of signals caused by the one or more physical structures based on the RF signal strength.

11. The communication system of claim 10, wherein the regulator module comprises an audio processing engine.

12. The communication system of claim 8, wherein one of the first or the second mathematical function is an exponential decay function.

13. The communication system of claim 8, wherein one of the first or the second mathematical function is a linear function.

14. The communication system of claim 8, wherein the volume of audio output generated by the speaker of the first of the transceiving devices varies based on the transmission impedance of signals caused by the one or more physical structures.

15. The communication system of claim 1, wherein each of the plurality of transceiving devices includes a regulator module.

* * * * *